United States Patent
Hecker et al.

(10) Patent No.: US 11,441,627 B2
(45) Date of Patent: Sep. 13, 2022

(54) DISC BRAKE AND BRAKE APPLICATION DEVICE FOR COMMERCIAL VEHICLES

(71) Applicant: WABCO Europe BVBA, Brussels (BE)

(72) Inventors: Jannis Hecker, Heidelberg (DE); Hans-Christian Jungmann, Gorxheimertal (DE); Vitalij Scherer, Leimen (DE)

(73) Assignee: WABCO Europe BVBA, Brussels (BE)

( * ) Notice: Subject to any disclaimer, the term of this patent is extended or adjusted under 35 U.S.C. 154(b) by 66 days.

(21) Appl. No.: 16/740,991

(22) Filed: Jan. 13, 2020

(65) Prior Publication Data

US 2020/0224741 A1 Jul. 16, 2020

(30) Foreign Application Priority Data

Jan. 16, 2019 (EP) ..................................... 19152037

(51) Int. Cl.
*F16D 65/84* (2006.01)
*B60T 1/06* (2006.01)
*F16D 55/225* (2006.01)
*F16D 65/18* (2006.01)
*F16D 65/78* (2006.01)
*F16D 125/40* (2012.01)

(52) U.S. Cl.
CPC ............... *F16D 65/84* (2013.01); *B60T 1/065* (2013.01); *F16D 55/225* (2013.01); *F16D 65/183* (2013.01); *F16D 2065/785* (2013.01); *F16D 2125/40* (2013.01)

(58) Field of Classification Search
CPC .......... F16D 65/18; F16D 65/82; F16D 65/84; F16D 65/183; F16D 55/225
USPC ..................................... 188/72.4–72.9, 264 G
See application file for complete search history.

(56) References Cited

U.S. PATENT DOCUMENTS 4,431,090 A * 2/1984 Kinoshita ............... F16D 65/18
188/264 G
4,506,768 A * 3/1985 Innocent ................. F16D 65/18
188/370
4,527,672 A * 7/1985 Schreiner ................ F16D 65/18
188/264 G (Continued)

FOREIGN PATENT DOCUMENTS

CN 102822556 A 12/2012
DE 9410455 U1 10/1995
(Continued)

*Primary Examiner* — Christopher P Schwartz
(74) *Attorney, Agent, or Firm* — Dickinson Wright PLLC (57) ABSTRACT

A brake application device (1) for a disc brake (2) of commercial vehicles comprising an actuating spindle (3) with, axially of the actuating spindle (3), a pressure plate (4) arranged on the actuating spindle (3), and the pressure plate (4) having an annular groove (6) radially for receiving a boot (5). A heat shield (7) is at least partially disposed between the pressure plate head (4a) and the boot (5) at a spacing (X). An insulating layer (8) may be present between the heat shield (7) and the pressure plate head (4a). The heat shield (7) may be a metal ring (10) encapsulated in or coated with an elastomer (9a). The heat shield (7) may alternatively be formed of plastic or silicone.

19 Claims, 13 Drawing Sheets

(56) References Cited

U.S. PATENT DOCUMENTS

| | | | | |
|---|---|---|---|---|
| 4,537,289 | A | * | 8/1985 | VonGrunberg ..... F16D 65/0979 188/264 G |
| 5,487,453 | A | * | 1/1996 | Moroni ................... F16D 65/82 188/264 G |
| 5,538,109 | A | | 7/1996 | Swank |
| 8,403,114 | B2 | * | 3/2013 | Falter ...................... F16D 65/00 188/71.9 |
| 2001/0047913 | A1 | | 12/2001 | Conti et al. |
| 2011/0233013 | A1 | * | 9/2011 | Siebke ................... F16D 65/18 188/264 G |

FOREIGN PATENT DOCUMENTS

| | | | |
|---|---|---|---|
| DE | 102007059777 A1 | | 6/2009 |
| DE | 102008054162 A1 | | 5/2010 |
| EP | 1972821 A1 | * | 9/2008 ........... F16D 55/226 |

* cited by examiner

DISC BRAKE AND BRAKE APPLICATION DEVICE FOR COMMERCIAL VEHICLES

TECHNICAL FIELD

The subject matter of the present disclosure relates to a brake application device for disc brakes of commercial vehicles, and to a disc brake for commercial vehicles.

BACKGROUND

In the field of commercial vehicles, disc brakes and their construction are well known. Sliding caliper disc brakes are preferably used nowadays. During a braking operation, a brake disc of the disc brake is clamped via a brake application apparatus. A force provided via a brake cylinder is transmitted to the brake application device via a rotary lever arranged on the disc brake. An actuating spindle arranged in the brake application device, axially in the direction of the brake disc, transmits the brake application force via a pressure piece to a brake application-side brake lining, the brake application-side brake lining and the rim-side brake lining clamping the brake disc. The disc brake is divided into a rim side and into a brake application side. A brake application side defines that side of the disc brake, on which the brake disc is clamped via a brake application device. A rim side defines that side of the disc brake, which is directed in the direction of the rim of a vehicle. In order to avoid dirt or other environmental influences passing via a brake disc well and an opening on the brake caliper for the actuating spindle into the interior of the disc brake, a boot is arranged between a pressure plate of the actuating spindle and the opening for the actuating spindle. The boot connects the pressure plate of the actuating spindle to the brake caliper. During a braking operation, the boot moves with the actuating spindle axially in the direction of the brake disc or, after a braking operation, moves axially in an opposed manner with respect to the brake disc. During a braking operation, the brake linings are in contact with the brake disc and generate heat in the region of the boot as a result of friction. As a result of the actuation of the brake cylinder and the heat generated during the braking operation, a positive pressure is produced in the brake caliper and in a brake application box, as a consequence of which the boot inflates, bears against that rear side of the pressure plate which points in an opposed manner with respect to the brake disc, and remains stuck as a result of the high temperatures. The brake application box comprises a brake application device, an adjusting device and a pressure piece. After cooling, crack formations frequently occur in the boot.

DE102007059777B4 solves the problem of inflating and sticking of the boot on the pressure plate, by the boot being produced from a high temperature material. It has been shown, however, that the high temperature material has a low crack resistance and a low service life. In addition, the high temperature material is very expensive to procure.

DE102008054162A1 discloses, for example, a heat shield defined as an insulating shield and bears completely or at least largely over the full surface area against the pressure plate of the actuating spindle. It is disadvantageous that, starting from the brake disc, the heat is transmitted directly to the heat shield. The heat shields also consist of a high temperature-resistant material which has the consequence that the heat shield prematurely forms cracks and the heat shield has to be replaced more frequently than the average for safety reasons.

SUMMARY

It is an object of the subject matter of the present disclosure to provide a heat shield for a brake application device and a disc brake for commercial vehicles which overcomes the disadvantages from the abovementioned prior art.

The object is achieved by virtue of the fact that a heat shield is arranged between a pressure plate head, an actuating spindle and a boot in a brake application device of a disc brake, the heat shield being arranged between the pressure plate head and the heat shield at a spacing X. The heat shield is not arranged on the full surface area of the rear side of the pressure plate. In other words, the heat shield is not arranged on the full surface area of that side of a pressure plate which faces away from the brake disc. The spacing from the heat shield prevents the heat shield from sticking on the pressure plate head. That is to say, the heat transfer of the brake disc between the pressure plate and the heat shield is interrupted by way of the spacing. It is a further advantage of the spacing between the heat shield and the pressure plate that high temperature material for the heat shield can be dispensed with.

Furthermore, it has been proven to be an advantage that the brake application device has an insulating layer between the pressure plate and the heat shield. The insulating layer interrupts the heat transfer, starting from the brake disc in the direction of the boot, for which reason that side of the heat shield which faces away from the brake disc cools and the surface temperature on the heat shield is lower than the surface temperature on the heat shield without an insulation layer.

In a further embodiment, the heat shield is a metal ring encapsulated in an elastomer or a metal ring coated with an elastomer. The basis of the heat shield is formed by a ring formed from metal. Other materials, such as plastics or composite materials, are also conceivable, however. The metal ring stabilizes the heat shield and holds the heat shield in position on the actuating spindle. In addition, an elastomer encapsulates the metal ring. Polymers which encapsulate the metal ring are also conceivable. The elastomer absorbs the radiated heat from the brake disc and protects the boot from sticking or, in other words, protects against fusing of the metal ring with the pressure plate as a result of the radiated heat of the brake disc. It is also conceivable to spray the elastomer onto the metal ring. The heat shield has the task of protecting the boot against sticking on the pressure plate of the actuating spindle.

In a further refinement, the metal ring is coated with the elastomer only on one side, in order to reduce costs. In the case of a single-sided coating of the metal ring, the side of the metal ring that faces the boot is to be coated to keep the boot from sticking to the metal ring, which may result in cracks after cooling of the metal ring.

In a further refinement, the metal ring is coated with the elastomer on one side that faces away from the boot to keep the temperature of the heat shield relatively low.

Moreover, in a further refinement, the heat shield may be formed from plastic or silicone. Both the ring for the shape and stability of the heat shield and the encapsulation or the coating are made completely from plastic or from silicone. It is conceivable to manufacture the heat shield from a single plastic or from a plurality of plastics.

Furthermore, it has been shown that the heat shield is advantageously arranged on the pressure plate or the pressure plate head by way of an arrangement, comprising a press fit or a free position. A press fit defines the connection of the heat shield to the pressure plate, in the case of which connection an interference fit is produced after the arrangement of the heat shield on the pressure plate, and longitudinal and transverse forces are transmitted in a non-positive manner. The heat shield can no longer move axially along the actuating spindle. In the second conceivable "free position" arrangement, the heat shield can move axially virtually freely along the pressure plate or the heat shield preferably has an axial play of from 0.1 mm to 3 mm, further preferably of from 0.1 mm to 1 mm. The heat shield is restricted merely by way of the termination collar of the boot.

It has been shown to be an advantage in a further embodiment that the insulating layer is an air layer. Air has a very low thermal conduction coefficient of 0.024 [W/(m*K)] in comparison with other materials, material mixtures or solid bodies. As a result of the low thermal conduction coefficient of the air, the high temperature in the disc brake, formed by way of the radiated heat of the brake disc, is already lowered considerably before the heat shield is reached.

In a further embodiment, the heat shield is configured as an O-ring. Both the pressure plate and the boot have a circular geometry, with the result that the heat shield covers the boot over the full surface area or at least partially against sticking on the pressure plate head. Furthermore, the heat shield configured as an O-ring can be centered or positioned on the pressure plate head. In particular, in a further embodiment, the spacing between the pressure plate head and the heat shield is greater than or equal to 1 mm. The spacing is required for arranging or for filling an additional insulation layer. In addition, the temperature decreases at an increasing spacing from the brake disc. Moreover, the tolerance range can be maintained in the assembly above a spacing of greater than or equal to 1 mm between the pressure plate head and the heat shield.

Furthermore, it has been shown in a further refinement that, in relation to the pressure plate head, the heat shield is arranged in parallel or obliquely between the pressure plate head and the boot. Depending on the refinement of the pressure plate, the heat shield can be arranged obliquely or in parallel with respect to the pressure plate head, as a result of which a homogeneous spacing, and therefore a homogeneous insulating layer, is achieved between the heat shield and the pressure plate head. The homogeneous insulating layer has the advantage that the thermal transfer is of equal magnitude over the entire surface area or at least predominantly over the entire surface area of the heat shield.

In addition, in a further embodiment, the heat shield has pins or grooves in the direction of the pressure plate head.

In accordance with a further refinement, the pins of the heat shield are configured to engage into grooves of the pressure plate head. Furthermore, the pins of the pressure plate head can engage into the grooves of the heat shield. In addition, the heat shield is connected to the pressure plate, in particular to the pressure plate head, such that it cannot rotate by way of the pins. In addition, by way of the pin arrangement on the heat shield, there is a homogeneous protection of the boot against heat effects, emanating from the brake disc and the brake linings.

It has been provided in a further refinement that the heat shield has at least three pins, and the pressure plate head has at least three grooves. The pins of the heat shield and the grooves of the pressure plate head are advantageously arranged geometrically as a triangular shape, and secure the heat shield against an axial rotational movement. The clearance between the pins of the heat shield makes air movements and/or convection possible, as a result of which a build-up of heat between the pressure plate head and the heat shield is avoided. The axial rotational movement of the heat shield does not have to be prevented completely. That is to say, the heat shield can have an axial play, the dimensions of the grooves of the pressure plate head being greater than those of the pins of the heat shield. In addition, the grooves of the pressure plate head and the pins of the heat shield are designed as a press fit for positioning the heat shield on the pressure plate head.

In a second embodiment, the heat shield particularly advantageously has six pins, and the pressure plate head has six grooves. Particularly reliable supporting of the heat shield on the pressure plate head is possible by way of the second embodiment.

In addition, it is provided in a further embodiment that a circumferential pin is arranged on the heat shield and engages into an annular groove of the pressure plate head. Advantages of the circumferential shoulder of the heat shield result in the assembly, since the circumferential shoulder of the pressure plate head can be mounted into the annular groove of the pressure plate head without further turning of the pressure plate head.

In a further embodiment, the pins of the heat shield are arranged on the heat shield radially on the outside, in relation to a pressure plate axis. By way of the arrangement of the pins on the outer region of the heat shield, the heat shield can be machined simply by way of machining processes such as punching and forming processes or by way of turning processes. An additional attachment of the pins to the heat shield is not required.

Moreover, in a further refinement, in the direction of the pressure plate head, the heat shield has elevations. The elevations of the pressure plate head serve to support the heat shield on the pressure plate head. It is also conceivable that the pressure plate head has elevations in the direction of the heat shield in order to support the heat shield on the pressure plate head. The elevations can be of different configuration in terms of their geometry and, for example, can have the shape of a rectangle, square, triangle or circle. The pressure plate head or the heat shield particularly advantageously has an even number of elevations, in order that the pressure plate head bears homogeneously against the heat shield or the heat shield bears homogeneously against the pressure plate head.

In a further embodiment, the elevations are constituent parts of the elastomer. In other words, the elevations are formed from the elastomer. The elevations can also be molded on the elastomer, however.

Furthermore, it has been shown that, in a further embodiment, in the direction of the brake application side of the disc brake, the pressure plate head has supporting elements. The supporting elements are geometric elevations, on which the heat shield is supported, a full surface area support of the heat shield on the pressure plate head being avoided. The shape of the supporting elements can vary. Additional costs are not produced, since the supporting elements are configured at the same time as the pressure plate or the pressure plate head, during the manufacturing process, comprising punching or casting, of the pressure plate or only of the pressure plate head.

Moreover, the object is achieved in a last advantageous embodiment by way of a disc brake for motor vehicles, the disc brake having a brake application device in accordance with one of the preceding embodiments.

BRIEF DESCRIPTION OF THE DRAWINGS

In the following detailed description, selected exemplary embodiments of the subject matter of the present disclosure will be described on the basis of the appended drawings, in which.

DETAILED DESCRIPTION OF THE DRAWINGS

Figure 1:
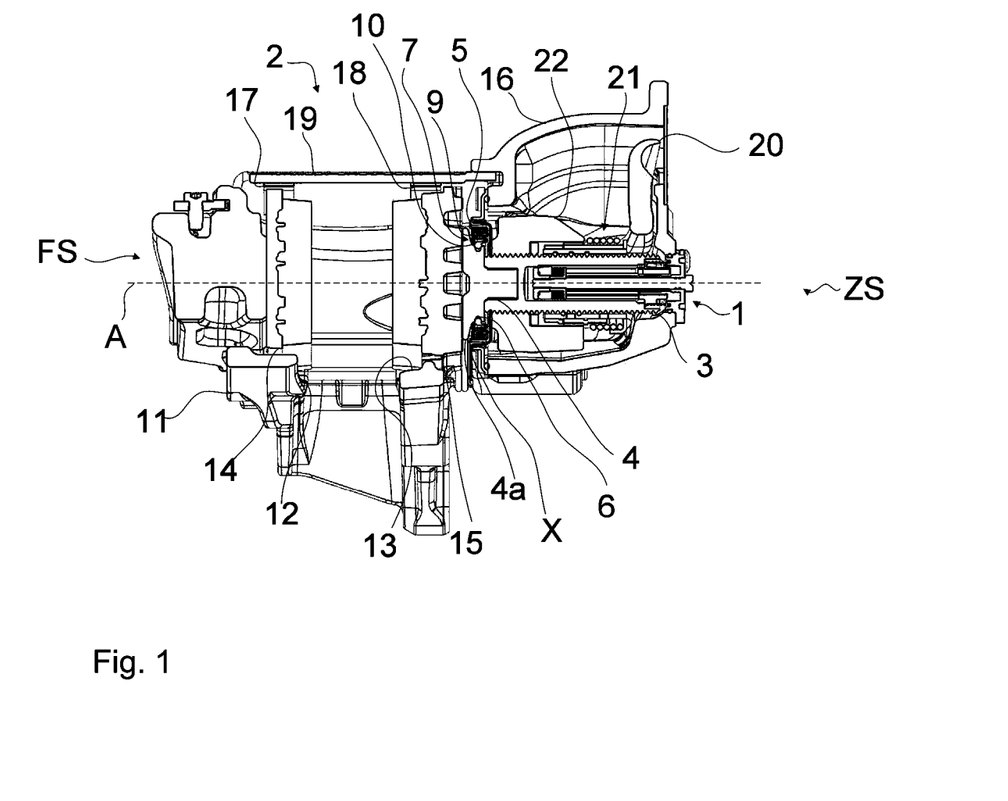
FIG. 1 shows a disc brake in a laterally sectioned view with a brake application device according to the subject matter of the present disclosure.

FIG. 1 shows a laterally sectioned view of a disc brake 2 with a brake application device 1. The disc brake 2 has a brake application side ZS and a rim side FS. On the rim side FS, a brake carrier 11 has a lining carrier well 12 for receiving a brake lining 14 and, on the brake application side ZS, a lining carrier well 13 for receiving a brake lining 15. Hold-down springs 17, 18 and a lining retaining bracket 19 secure the brake linings 14, 15 against falling radially out of the brake lining carrier wells 12, 13. The brake application device 1 has a rotary lever 20 which, during a brake application operation, displaces an actuating spindle 3 which has a pressure plate 4 axially, along an axial axis A, in the direction of the brake linings 14, 15, as a result of which the brake linings 14, 15 are pressed against a brake disc (not shown). The pressure plate 4 has an annular groove 6, in which a boot 5 is arranged. The boot 5 is additionally connected to a brake caliper 16 by way of a cover, and protects the brake application device 1 against environmental influences such as dust, sand, stones or snow. A heat shield 7 is arranged between the boot 5 and a pressure plate head 4a of the pressure plate 4. The heat shield 7 protects the boot 5 against sticking on the pressure plate head 4a during the resetting operation and against tearing off from the pressure plate head 4a during a brake application operation, that is to say protects against damage of the boot 5. The heat shield 7 consists of a metal ring 10 and an elastomer 9. In FIG. 1, the heat shield 7 is arranged fixedly on the pressure plate 4 by a pressing method. As an additional insulation, the brake application device 1 has an insulating layer 8 which consists of air between the pressure plate head 4a and the heat shield 7 (see FIGS. 2 and 2a). That is to say, the heat shield 7 is not arranged directly on the pressure plate head 4a, but rather is arranged at a spacing X of approximately 1 mm on the pressure plate head 4a. Finally, the disc brake 2 has an adjusting device 21 and a pressure piece 22 in the brake caliper 16 for setting the air play between the brake disc and the brake linings 14, 15. The air play defines the spacing between a brake lining 14, 15 and the brake disc.

Figure 2:
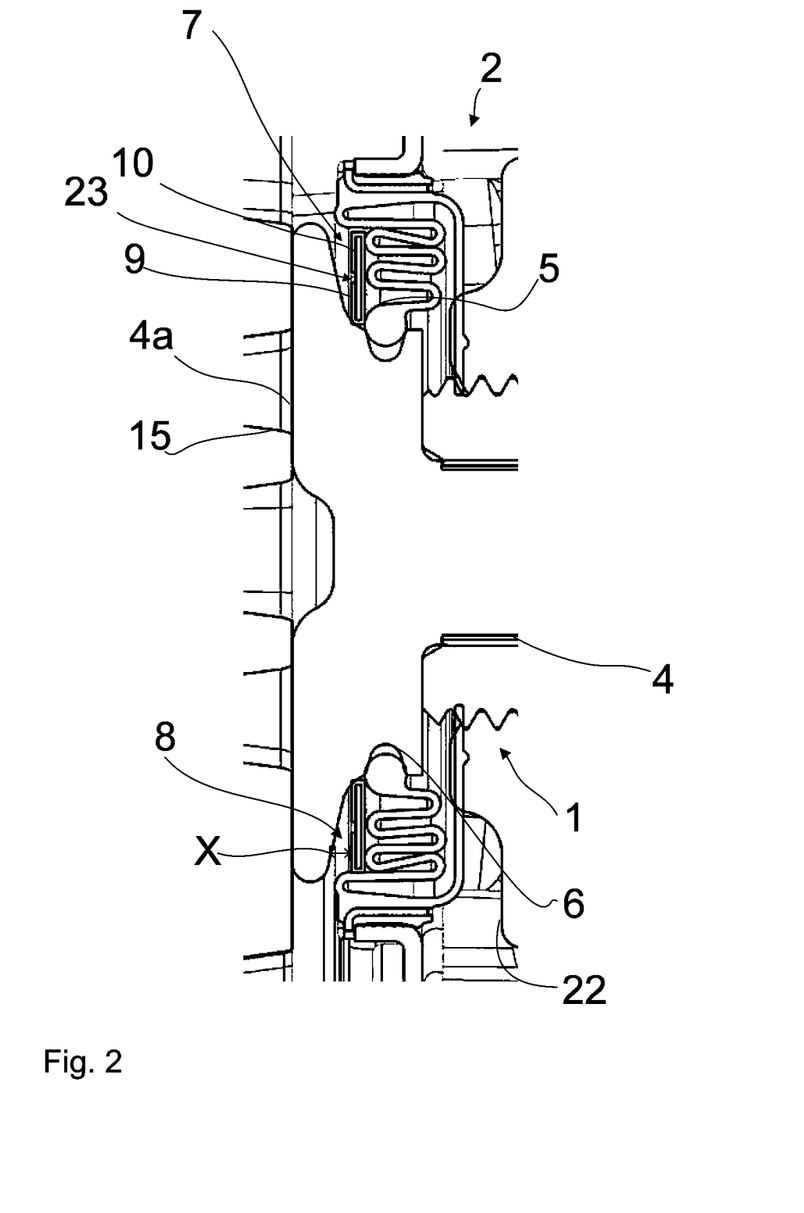
FIG. 2 shows a part detail of the brake application device with a heat shield.

FIG. 2 clarifies the positioning of the heat shield 7 between the pressure plate head 4a and the boot 5 in a detailed view of the brake application device 1 of the disc brake 2 according to FIG. 1. Contrary to FIG. 1, the heat shield 7 is arranged freely on the pressure plate 4 and is coated with an elastomer 9. In other words, the heat shield 7 bears with a play against the pressure plate head 4a without a pressing method. The spacing X of approximately 1 mm between the pressure plate head 4a and the heat shield 7 can be seen clearly. The additional spacing X between the pressure plate head 4a and the heat shield 7 lowers the temperature of the radiated heat produced in the case of a braking operation by way of the brake linings 14, 15 bearing against the brake disc. In addition to the heat shield 7, the boot 5 is protected against excessively high temperatures by way of the insulating layer 8 of air. Excessively high temperatures lead, for example, to the boot 5 sticking on the pressure plate 4, the pressure plate head 4a or on the heat shield 7. The elastomer 9 of the heat shield 7 is an additional protection and avoids sticking of the metal ring 10 of the heat shield 7 on the boot 5. Moreover, the elastomer 9 of the heat shield 7 has openings 23. The openings 23 serve as tool rests during the encapsulation of the metal ring 10.

Figure 2A:
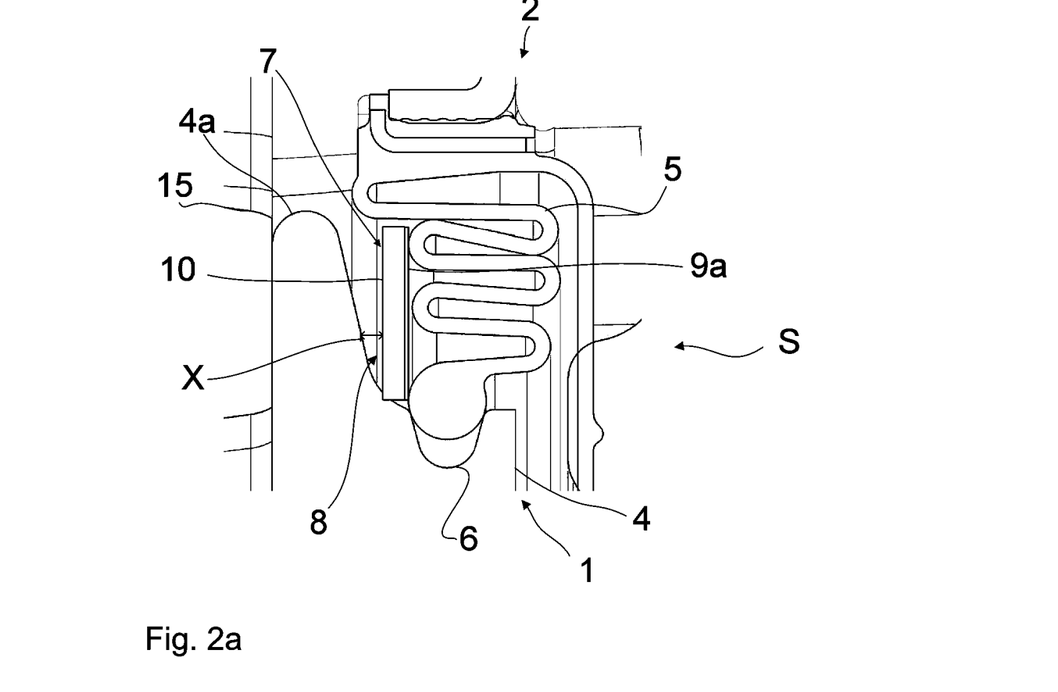
FIG. 2a shows a detailed view of the heat shield in the installed state with a heat shield coated on one side.

FIG. 2a shows a further embodiment of the heat shield 7 according to FIGS. 1 and 2. The heat shield 7 has an elastomer 9a only on a side S of the metal ring 10, which side S faces the boot 5, however. That is to say, the elastomer 9a of the heat shield 7 does not encapsulate the metal ring 10 of the heat shield 7, but rather the metal ring 10 of the heat shield 7 is coated with the elastomer 9a of the heat shield 7 on the side S which faces the boot 5.

Figure 3:
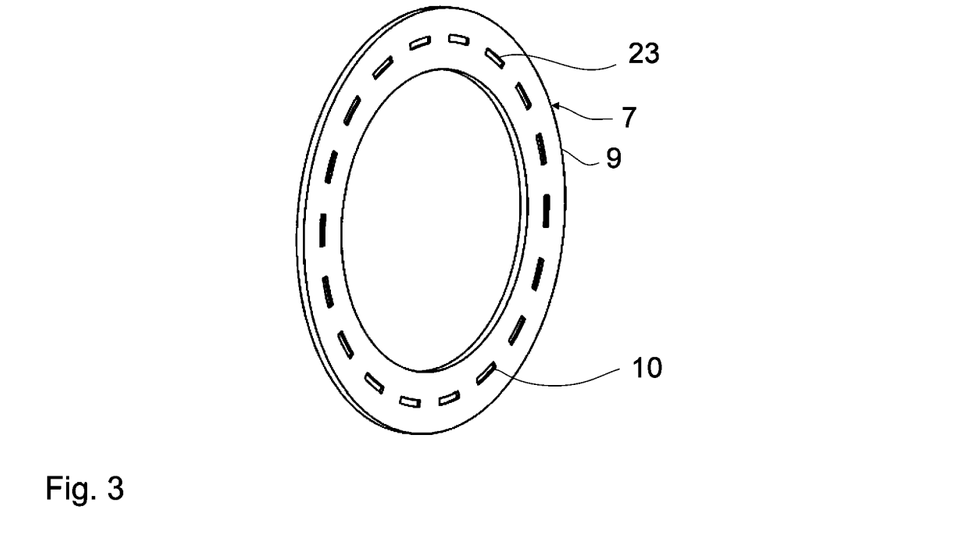
FIG. 3 shows a heat shield in a view turned to the side.

FIG. 3 shows the heat shield 7 according to FIGS. 1 and 2 in detail. The configuration of the heat shield 7 as an O-ring can be seen clearly. In addition, the openings 23 of the elastomer 9 are visible. In the exemplary embodiment, the openings 23 are made in the elastomer 9 only on one side. When the heat shield 7 is installed in the disc brake 2 according to FIGS. 1 to 2a, the openings 23 point in the direction of the rim side FS.

Figure 3A:
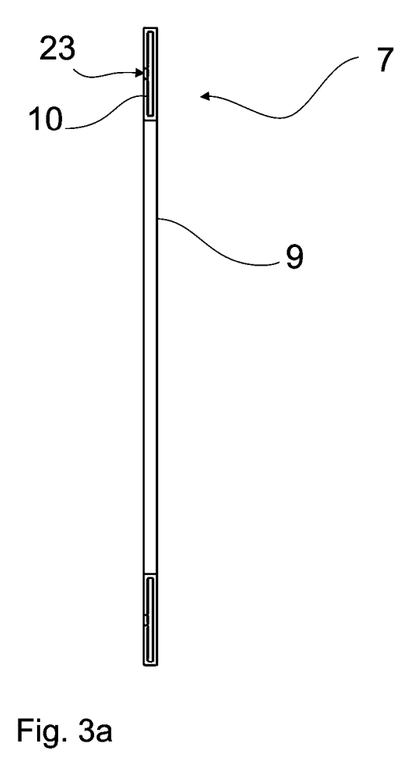
FIG. 3a shows a sectioned view of the heat shield in cross section.

FIG. 3a shows the heat shield 7 according to FIG. 1, FIG. 2 and FIG. 3 in cross section. In particular, the complete encapsulation of the metal ring 10 of the heat shield 7 with the elastomer 9 of the heat shield 7 can be seen in detail.

Figure 3B:
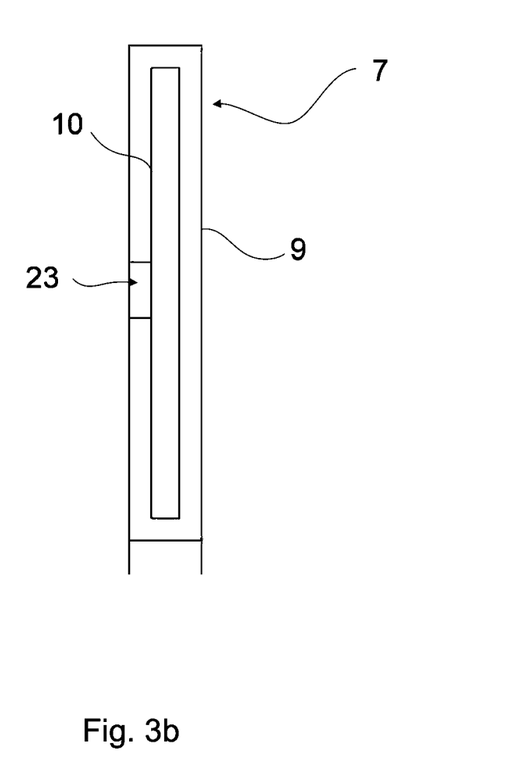
FIG. 3b shows a detailed view of the sectioned heat shield according to FIG. 3a, FIG. 4 shows a view, turned to the side, of the pressure piece and a heat shield with pins.

FIG. 3b shows a last detailed view of the heat shield 7 according to FIG. 1, FIG. 2, FIG. 3 and FIG. 3a in cross section.

Figure 4:
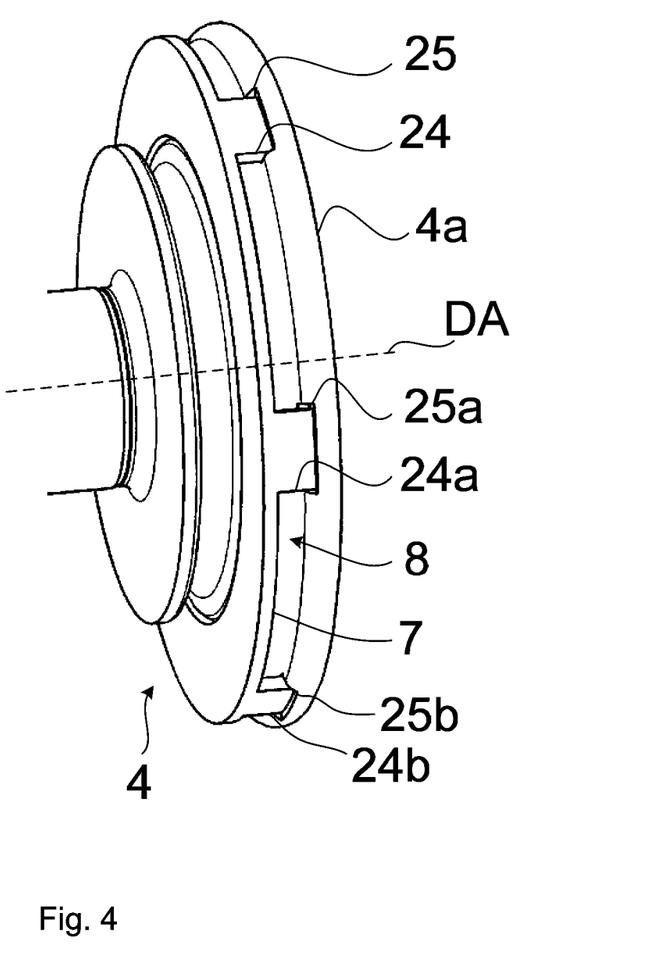

FIG. 4 shows a second embodiment of the heat shield 7 on the pressure plate 4, the boot 5 not being shown for an improved plan view of the heat shield 7. The heat shield 7 has pins 24, 24a, 24b axially on a pressure plate axis DA, in the direction of the pressure plate head 4a. The pins 24, 24a, 24b engage into grooves 25, 25a, 25b of the pressure plate head 4a. Air is situated between the heat shield 7 and the pressure plate head 4a as an insulating layer 8. The heat shield 7 is arranged parallel to the pressure plate head 4a, in relation to the pressure plate head 4a.

Figure 5:
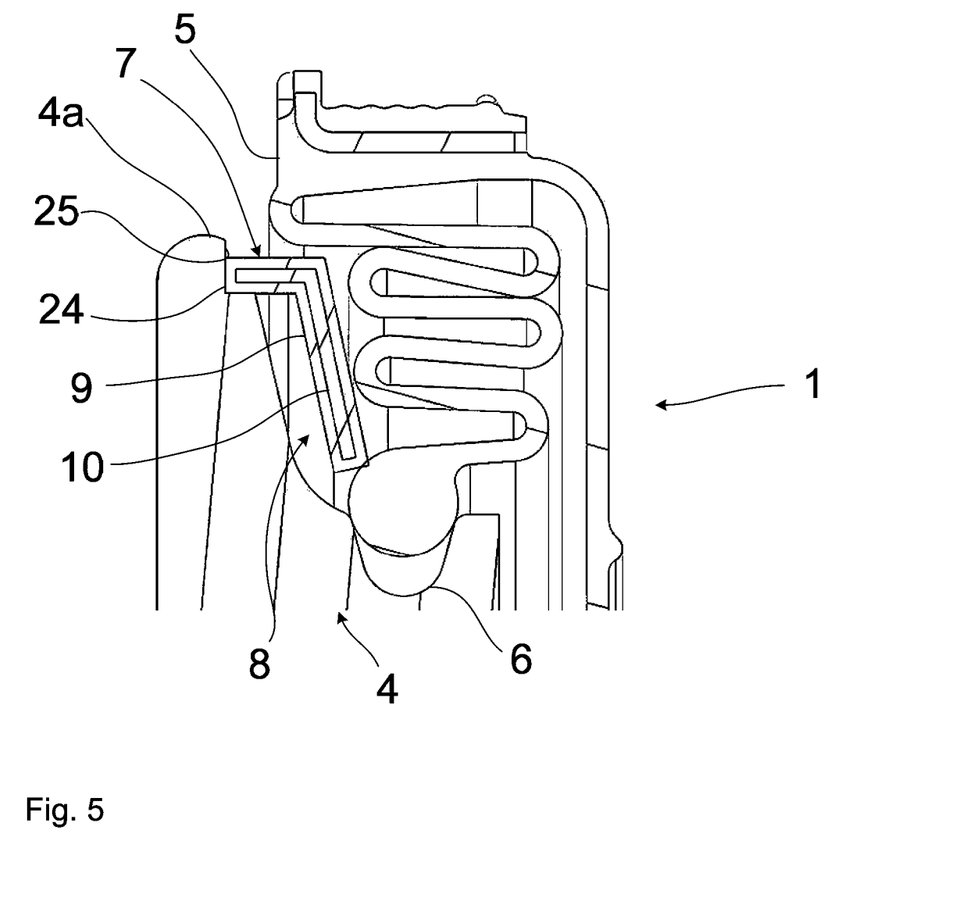
FIG. 5 shows a sectioned part view of a brake application device with a heat shield with pins.

FIG. 5 shows a brake application device 1 according to FIGS. 1 and 2 with a heat shield 7 according to FIG. 4. The parallel arrangement of the heat shield 7 in relation to the pressure plate head 4a can be seen particularly clearly. The heat shield 7 is arranged between the boot 5 and the pressure plate head 4a. In particular, the engagement of the pin 24 of the heat shield 7 into the groove 25 of the pressure plate head 4a is shown in detail. In the embodiment according to FIG. 5, the heat shield 7 is a metal ring 10 encapsulated in the elastomer 9.

Figure 6:
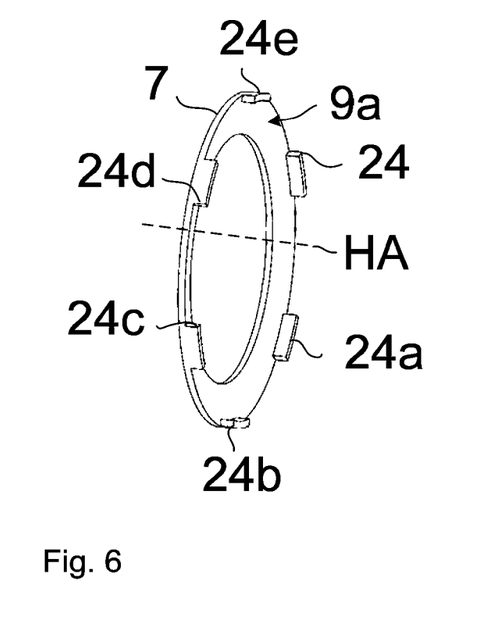
FIG. 6 shows a heat shield which has pins in a frontal view turned to the side.

FIG. 6 shows the heat shield 7 according to FIGS. 4 and 5 in detail. The heat shield 7 has six pins 24, 24a, 24b, 24c, 24d, 24e which are arranged axially with respect to an axis HA of the heat shield 7 on the outer edge of the heat shield 7. In addition, the heat shield 7 has a coating with an elastomer 9a on the side, on which the pins 24, 24a, 24b, 24c, 24d, 24e are arranged.

Figure 6A:
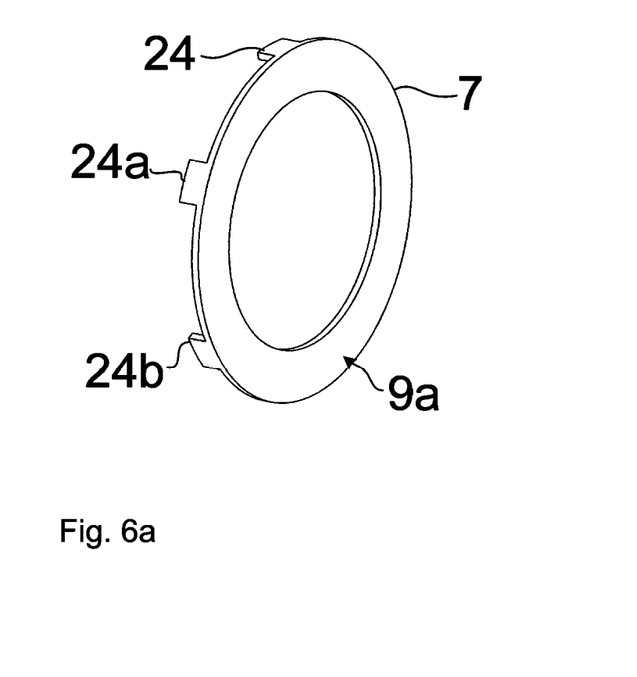
FIG. 6a shows a heat shield which has pins in a rear view turned to the side.

FIG. 6a shows the heat shield 7 according to FIGS. 4 to 6 from the rear side. In the exemplary embodiment, the rear side, that is to say the opposite side, on which the pins 24, 24a, 24b, 24c, 24d, 24e are arranged, has a coating with an elastomer 9a.

Figure 7:
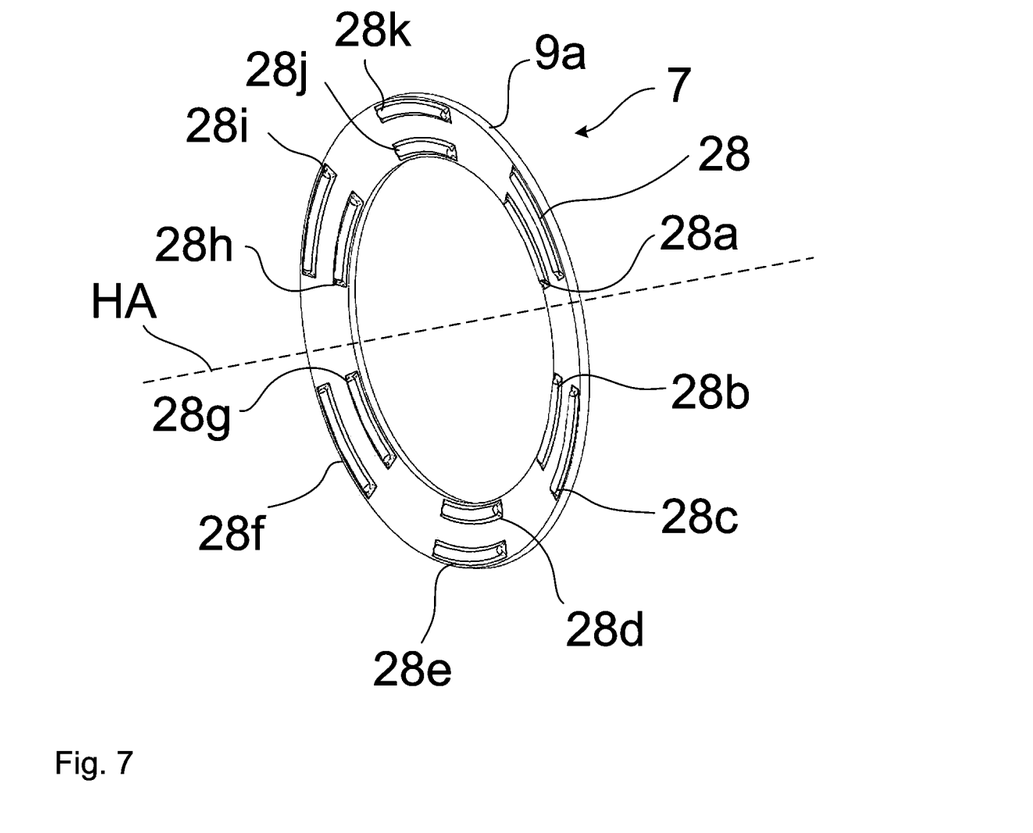
FIG. 7 shows a heat shield with elevations.

FIG. 7 shows a third embodiment of the heat shield 7 according to FIG. 1 and FIG. 2. In the third embodiment, the heat shield 7 has elevations 28, 28a, 28b, 28c, 28d, 28e, 28f, 28g, 28h, 28i, 28j, 28k for supporting the heat shield 7 on the pressure plate head 4a. The elevations 28, 28a, 28b, 28c, 28d, 28e, 28f, 28g, 28h, 28i, 28j, 28k have a rectangular shape and are formed from the elastomer 9. In addition, the elevations 28, 28a, 28b, 28c, 28d, 28e, 28f, 28g, 28h, 28i, 28j, 28k are arranged on the elastomer 9 in a circular manner. Two respective elevations 28 and 28a; 28b and 28c; 28d and 28e; 28f and 28g; 28h and 28i; as well as 28j and 28k are arranged above one another radially with respect to the axis HA of the heat shield 7.

Figure 7A:
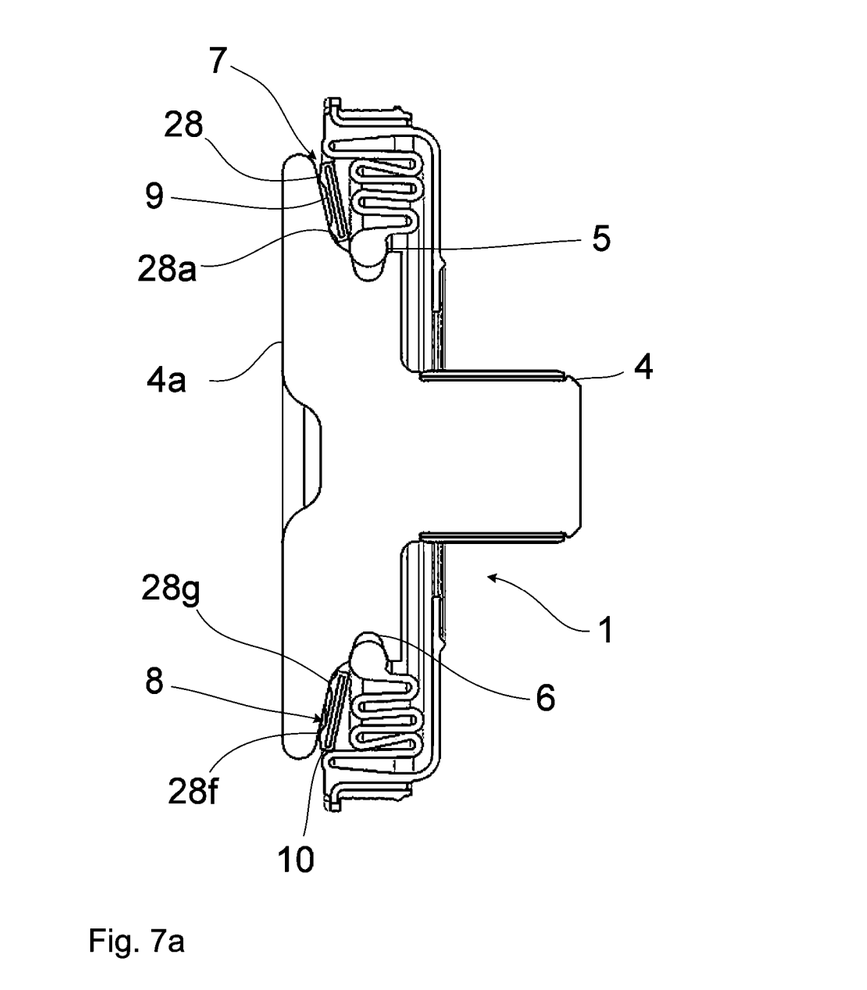
FIG. 7a shows a pressure plate with a heat shield according to FIG. 7 in the installed state.

FIG. 7a shows a brake application device 1 according to FIG. 1 and FIG. 2 with a heat shield according to FIG. 7. The heat shield 7 is supported partially by way of the elevations 28, 28a, 28g, 28f on the pressure plate head 4a. An insulating layer 8 of air is arranged between the elevations 28, 28a, 28g, 28f of the heat shield 7 and the pressure plate head 4a.

Figure 8:
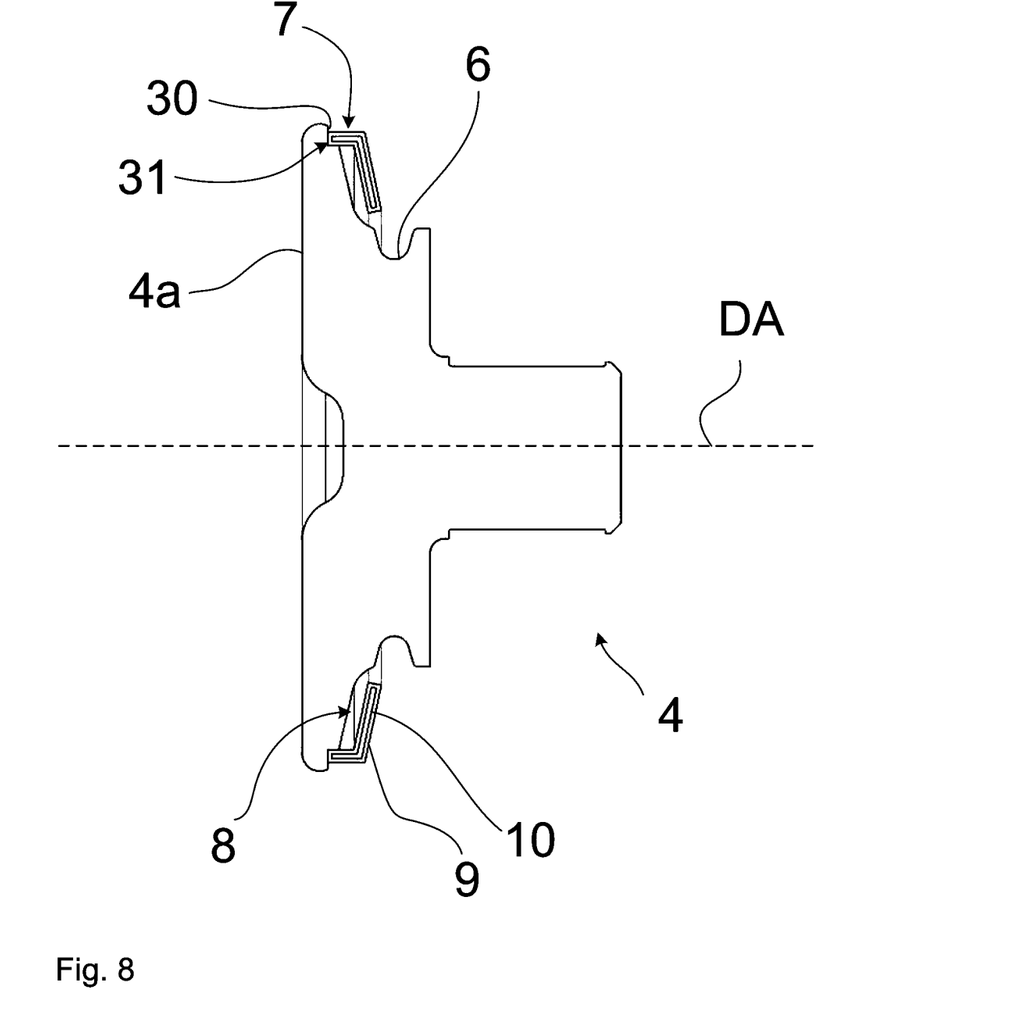
FIG. 8 shows a pressure plate with an annular groove in the pressure plate head, and a heat shield with a circumferential shoulder.

FIG. 8 shows a further exemplary embodiment for arranging the heat shield 7 on the pressure plate head 4a of the brake application device 1 according to FIG. 1 and FIG. 2. The heat shield 7 has a circumferential shoulder 31 radially at the outer end of the heat shield 7. The circumferential shoulder 31 of the heat shield 7 is produced by way of mechanical deformation of the heat shield 7. In cross section, the heat shield 7 with the circumferential shoulder 31 corresponds to an L shape. An annular groove 30 is made by pressing methods radially on the outer edge of the pressure plate head 4a. The heat shield 7 is supported by way of the circumferential shoulder 31 in the annular groove 30 of the pressure plate head 4a. That side of the heat shield 7 which lies opposite the circumferential shoulder 31 of the heat shield 7 is supported on the boot 5 (see FIG. 5).

Figure 8A:
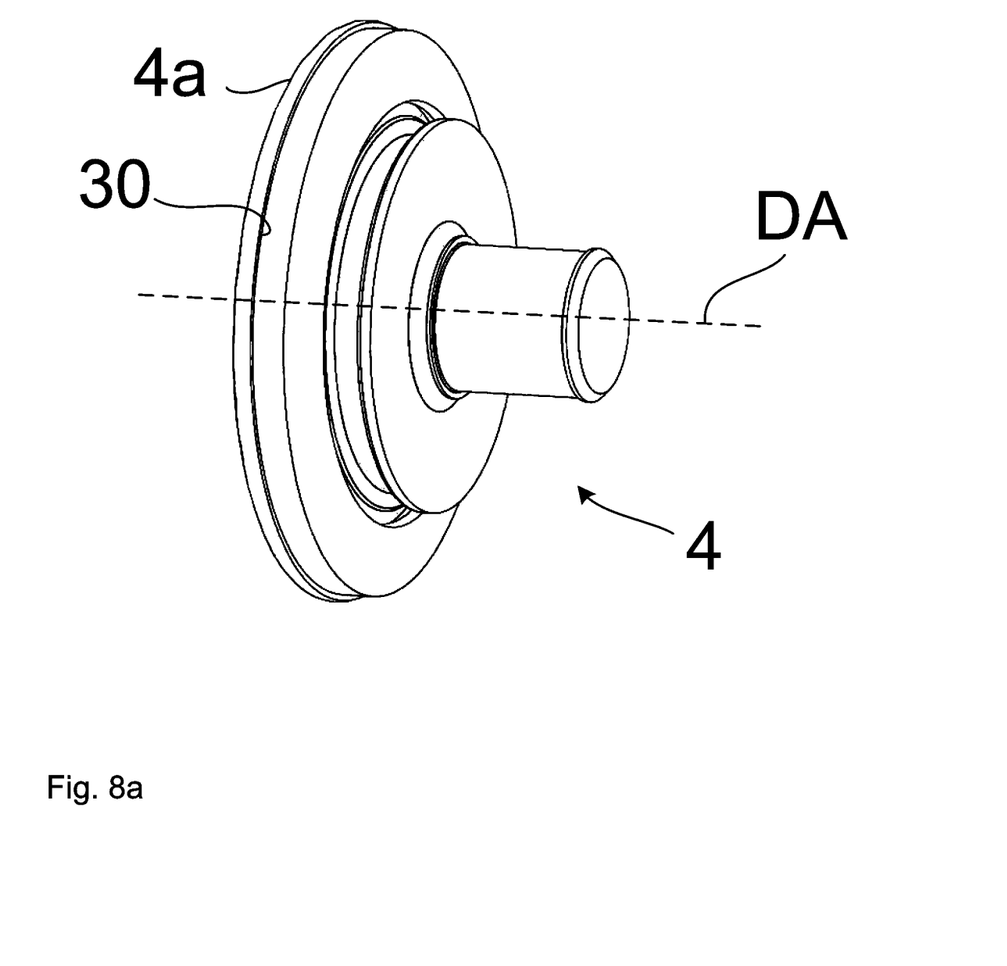
FIG. 8a shows a pressure plate with a pressure plate head according to FIG. 8 in detail.

FIG. 8a once again shows the annular groove 30 of the pressure plate head 4a of the pressure plate 4 according to FIG. 1 and FIG. 2 in detail.

Figure 9:
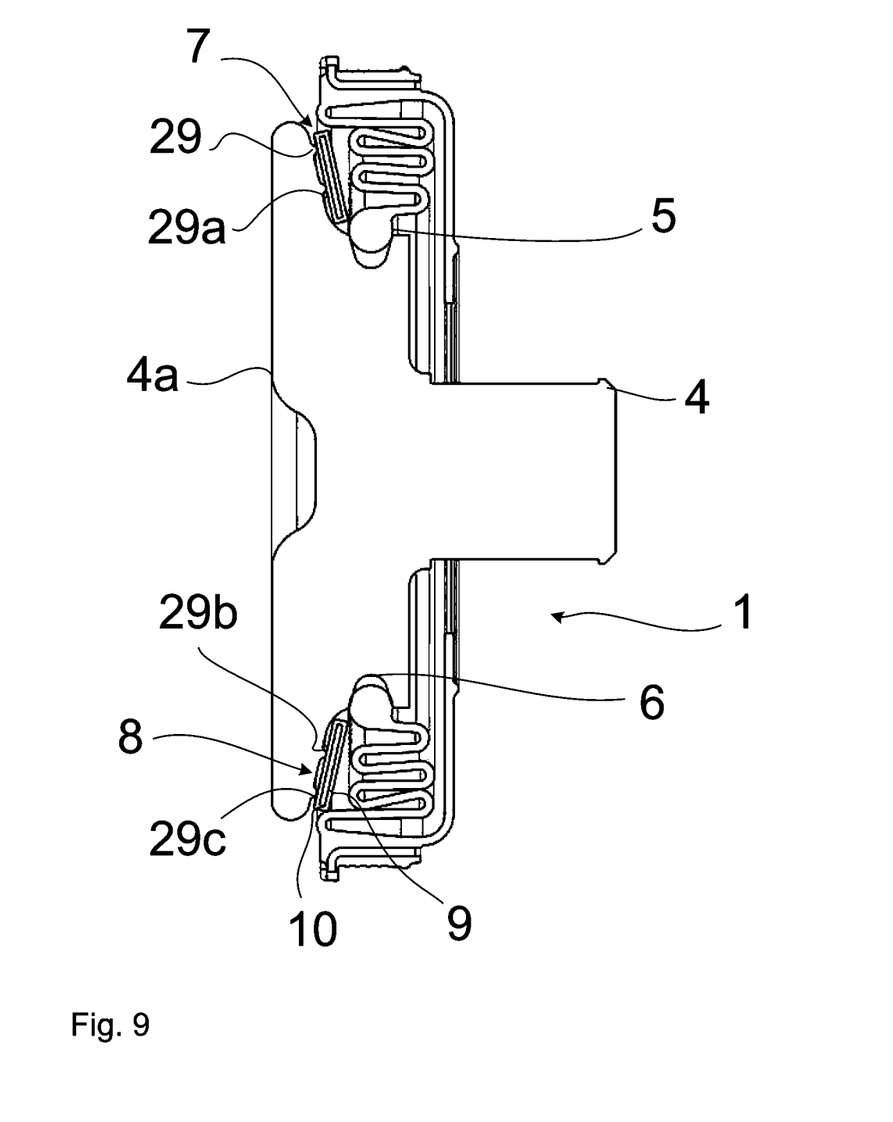
FIG. 9 shows a pressure plate with supporting elements on the pressure plate head.

FIG. 9 shows a further refinement of the brake application device 1 with a heat shield 7 according to FIG. 1 and FIG. 2. Supporting elements 29, 29a, 29b, 29c are arranged on the pressure plate head 4a in the direction of the heat shield 7. The supporting elements 29, 29a, 29b, 29c have the same effect as the elevations 28, 28a, 28b, 28c, 28d, 28e, 28f, 28g, 28h, 28i, 28j, 28k of the heat shield according to FIG. 7 and FIG. 7a. Air as an insulating layer 8 against sticking of the heat shield 7 on the pressure plate head 4a is contained between the supporting elements 29, 29a, 29b, 29c.

Figure 9A:
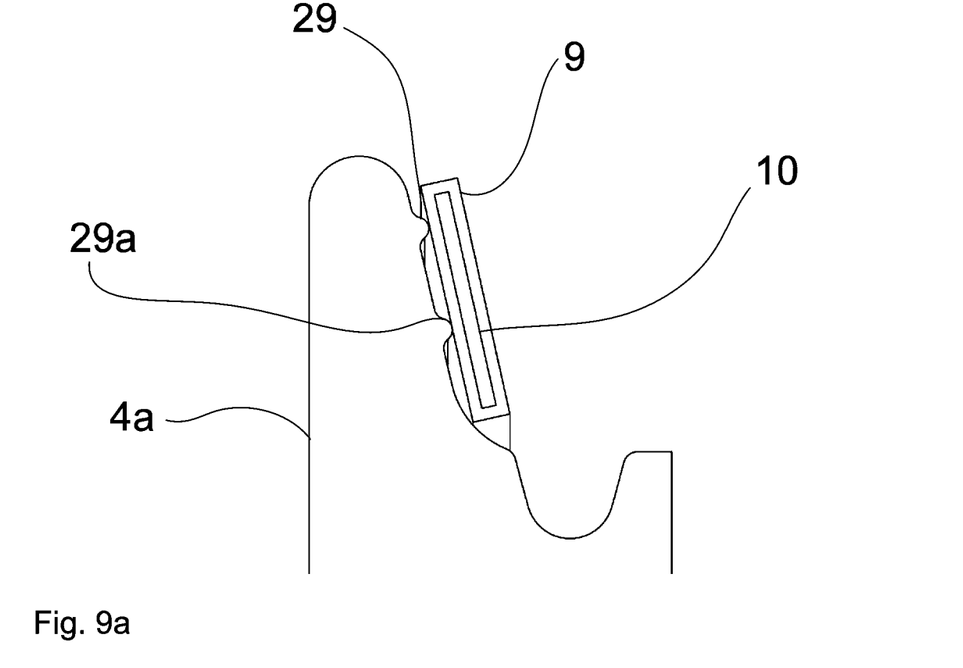
FIG. 9a shows a pressure plate with supporting elements according to FIG. 9 in detail.

FIG. 9a once again shows the pressure plate head 4a with the supporting elements 29, 29a, 29b, 29c according to FIG. 9 in detail.

While the above description constitutes the preferred embodiments of the present invention, it will be appreciated that the invention is susceptible to modification, variation and change without departing from the proper scope and fair meaning of the accompanying claims.

LIST OF DESIGNATIONS AS PART OF THE DESCRIPTION

1 Brake application device
2 Disc brake
3 Actuating spindle
4 Pressure plate
4a Pressure plate head
5 Boot
6 Annular groove of the pressure plate 4
7 Heat shield
8 Insulating layer
9, 9a Elastomer of the heat shield 7
10 Metal ring of the heat shield 7
11 Brake carrier
12-13 Lining carrier well
14-15 Brake lining
16 Brake caliper
17, 18 Hold-down spring
19 Lining retaining bracket
20 Rotary lever
21 Adjusting device
22 Pressure piece
23 Openings of the elastomer 9 of the heat shield 7
24-24e Pins of the heat shield 7
25-25b Grooves of the pressure plate head 4a
28-28k Elevations of the heat shield (7)
29-29c Supporting elements of the pressure plate head (4a)
30 Annular groove of the pressure plate head (4a)
31 Circumferential shoulder of the heat shield (7)
A Axial axis of the brake application device 1
DA Pressure plate axis
HA Axis of the heat shield 7
S That side of the metal ring 10 which faces the boot
X Spacing between the pressure plate 4 and the heat shield 7
FS Rim side
ZS Brake application side

The invention claimed is:

1. A brake application device (1) for a disc brake (2) of commercial vehicles, the brake application device comprising:
   an actuating spindle (3) with a pressure plate (4) axially arranged on the actuating spindle (3), the pressure plate (4) having a pressure plate head (4a) and a radial annular groove (6) for receiving a boot (5), wherein a heat shield (7) is at least partially disposed between the pressure plate head (4a) and the boot (5) at a spacing (X);
   wherein the heat shield (7) is separate from the boot (5) and the heat shield (7) is a metal ring (10) encapsulated in or coated with an elastomer (9a).

2. The brake application device (1) for a disc brake (2) as claimed in claim 1, wherein the heat shield (7) comprises pins (24, 24a, 24b, 24c, 24d, 24e) extending in a direction toward the pressure plate head (4a), wherein the pins extend axially.

3. The brake application device (1) for a disc brake (2) as claimed in claim 2, wherein the pressure plate head (4a) comprises grooves (25, 25a, 25b) configured to receive the pins (24, 24a, 24b, 24c, 24d, 24e) of the heat shield (7).

4. The brake application device (1) for a disc brake (2) as claimed in claim 3, wherein the heat shield (7) has at least three of the pins (24, 24a, 24b, 24c, 24d, 24e), and the pressure plate head (4a) has at least three of the grooves (25, 25a, 25b).

5. The brake application device (1) for a disc brake (2) as claimed in claim 2, wherein the pins (24, 24a, 24b, 24c, 24d, 24e) of the heat shield (7) are arranged on the heat shield (7) radially on the outside, in relation to a pressure plate axis (DA), wherein the pins are located at a radial outermost edge of the heat shield.

6. The brake application device (1) as claimed in claim 1, further comprising an insulating layer (8) between the pressure plate head (4a) and the heat shield (7).

7. The brake application device (1) as claimed in claim 6, wherein the insulating layer (8) is an air layer.

8. The brake application device (1) as claimed in claim 1, wherein the heat shield (7) comprises elevations (28, 28a, 28b, 28c, 28d, 28e, 28f, 28g, 28h, 28i, 28j, 28k) toward the pressure plate head (4a) for supporting the heat shield (7) on the pressure plate head (4a).

9. The brake application device (1) for a disc brake (2) as claimed in claim 8, wherein the elevations (28, 28a, 28b, 28c, 28d, 28e, 28f, 28g, 28h, 28i, 28j, 28k) of the heat shield are constituent parts of an elastomer coating or encapsulation of the heat shield (7).

10. The brake application device (1) as claimed in claim 1, wherein the metal ring (10) is coated with an elastomer (9a) on one side facing the boot (6).

11. The brake application device (1) as claimed in claim 1, wherein the metal ring (10) is coated with an elastomer (9a) on one side facing away from the boot (6).

12. The brake application device (1) as claimed in claim 1, wherein the heat shield (7) is made of plastic or silicone.

13. The brake application device (1) as claimed in claim 1, wherein the heat shield (7) is disposed on the pressure plate (4) or the pressure plate head (4a).

14. The brake application device (1) as claimed in claim 1, wherein the heat shield (7) has the shape of an O-ring.

15. The brake application device (1) as claimed in claim 1, wherein the spacing (X) is greater than or equal to 1 mm.

16. The brake application device (1) for a disc brake (2) as claimed in claim 1, wherein the heat shield (7) has a circumferential shoulder (31), and the pressure plate head (4a) has an annular groove (30) for receiving the circumferential shoulder (31), wherein the circumferential shoulder extends continuously around the heat shield.

17. The brake application device (1) as claimed in claim 1, wherein the pressure plate head (4a) comprises supporting elements (29, 29a, 29b, 29c) for supporting the heat shield (7).

18. A disc brake (2) for motor vehicles comprising a brake carrier (11) with at least one brake lining (14, 15) arranged in a lining carrier well (12, 13), a brake caliper (16) which engages at least one brake lining (13, 14) around the brake carrier (11) for axially applying the at least one brake lining (13, 14) to a brake disc, a brake application device (1) arranged on a brake application side (ZS) of the brake caliper (16) for clamping a brake disc via the brake lining (15) during a braking operation, wherein the brake application device (1) is configured as claimed in claim 1.

19. A brake application device (1) for a disc brake (2) of commercial vehicles, the brake application device comprising:
an actuating spindle (3) with a pressure plate (4) axially arranged on the actuating spindle (3), the pressure plate (4) having a pressure plate head (4a) and a radial annular groove (6) for receiving a boot (5), wherein a heat shield (7) is at least partially disposed between the pressure plate head (4a) and the boot (5) at a spacing (X);
wherein the heat shield (7) is a metal ring (10) encapsulated in or coated with an elastomer (9a);
wherein the heat shield (7) is arranged between the pressure plate head (4a) and the boot (5) in parallel with the pressure plate head (4a), wherein the pressure plate head includes an oblique surface relative to the axis and the heat shield is arranged obliquely relative to the axis, and the heat shield and pressure plate surface are parallel.

* * * * *